(12) United States Patent
Jang et al.

(10) Patent No.: US 12,386,781 B2
(45) Date of Patent: Aug. 12, 2025

(54) METHOD AND APPARATUS FOR RE-REGISTERING PRE-REGISTERED IDENTITY INFORMATION IN NEW IDENTITY RECOGNITION SYSTEM

(71) Applicant: ELECTRONICS AND TELECOMMUNICATIONS RESEARCH INSTITUTE, Daejeon (KR)

(72) Inventors: Jae Yoon Jang, Daejeon (KR); Jae Hong Kim, Daejeon (KR); Ho Sub Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/584,048

(22) Filed: Feb. 22, 2024

(65) Prior Publication Data

US 2024/0378178 A1    Nov. 14, 2024

(30) Foreign Application Priority Data

May 8, 2023   (KR) .................. 10-2023-0059387

(51) Int. Cl.
   *G06F 16/11*    (2019.01)
   *G06V 40/16*    (2022.01)

(52) U.S. Cl.
   CPC ............ *G06F 16/119* (2019.01); *G06V 40/16* (2022.01)

(58) Field of Classification Search
   CPC ...... G06F 16/119; G06V 40/16; G06N 3/0475
   See application file for complete search history.

(56) References Cited

U.S. PATENT DOCUMENTS

| | | | | |
|---|---|---|---|---|
| 11,790,558 B1 * | 10/2023 | Balakrishnan | ......... | G06N 20/00 382/154 |
| 2024/0320312 A1 * | 9/2024 | Dalmasso | ............... | G06F 21/32 |
| 2024/0320977 A1 * | 9/2024 | Kim | ......................... | G06T 7/20 |

FOREIGN PATENT DOCUMENTS

| | | | | |
|---|---|---|---|---|
| EP | 4012621 A1 * | 6/2022 | ............ | G06N 3/084 |
| KR | 10-1302661 B1 | 9/2013 | | |
| KR | 10-2017-0082078 A | 7/2017 | | |
| KR | 10-2020-0110064 A | 9/2020 | | |
| KR | 10-2177453 B1 | 11/2020 | | |
| KR | 10-2021-0003916 A | 1/2021 | | |

(Continued)

*Primary Examiner* — Apu M Mofiz
*Assistant Examiner* — J Mitchell Curran
(74) *Attorney, Agent, or Firm* — LRK PATENT LAW FIRM

(57) ABSTRACT

The present invention relates to a method and apparatus for re-registering pre-registered identity information in a new identity recognition system. A method of re-registering identity feature information in an identity recognition system according to an embodiment of the present disclosure may include: identifying one or more first identity feature information calculated by the first feature calculation device and stored in a database; generating one or more latent space information by inputting the one or more first identity feature information into a specific model for latent space estimation; generating one or more second identity feature information by inputting the one or more latent space information into a second feature calculation device; and storing the one or more second identity feature information in a new database.

19 Claims, 5 Drawing Sheets

(56) References Cited

FOREIGN PATENT DOCUMENTS

| | | | |
|---|---|---|---|
| KR | 10-2023-0034124 A | 3/2023 | |
| WO | WO-2021008195 A1 * | 1/2021 | ............. G06F 18/25 |
| WO | WO-2024000989 A1 * | 1/2024 | |

* cited by examiner

METHOD AND APPARATUS FOR RE-REGISTERING PRE-REGISTERED IDENTITY INFORMATION IN NEW IDENTITY RECOGNITION SYSTEM

CROSS-REFERENCE TO RELATED APPLICATION(S)

This application claims the benefit of earlier filing date and right of priority to Korean Application No. 10-2023-0059387, filed on May 8, 2023, the contents of which are all hereby incorporated by reference herein in their entirety.

BACKGROUND

1. Technical Field

The present disclosure relates to a method and apparatus for re-registering pre-registered identity information in a new identity recognition system.

2. Description of Related Art

Identity recognition technology is a technology that calculates the user's personal identity feature information using the user's face image, stores it in a database, and then performs user authentication by comparing it with the value stored in the database in the recognition stage.

In an identity recognition system, the main feature calculation device that calculates personal identity feature information may often be changed for reasons such as performance improvement. In this case, the expression range of the main feature calculation device may vary. Therefore, it is impossible to use the existing registered information as is. User information needs to be re-registered to fit the new representation domain of the changed main feature computing device.

SUMMARY

The technical object of the present disclosure is to provide a method and apparatus for re-registering pre-registered identity information in a new identity recognition system.

The technical object of the present disclosure is to provide a method and apparatus for re-registering a pre-registered user according to the representation domain of a changed feature calculation device using the identity feature information.

The technical object of the present disclosure is to provide a method and apparatus for learning a device that transforms feature vectors using already registered identity vectors, existing feature calculation devices, and new feature calculation devices, and for converting/re-registering identity feature information using a learned device.

The technical objects to be achieved by the present disclosure are not limited to the above-described technical objects, and other technical objects which are not described herein will be clearly understood by those skilled in the pertinent art from the following description.

A method of re-registering identity feature information in an identity recognition system according to an aspect of the present disclosure may comprise: identifying one or more first identity feature information calculated by the first feature calculation device and stored in a database; generating one or more latent space information by inputting the one or more first identity feature information into a specific model for latent space estimation; generating one or more second identity feature information by inputting the one or more latent space information into a second feature calculation device; and storing the one or more second identity feature information in a new database. Herein, the specific model may correspond to a model learned through similarity comparison between i) first output data of the second feature calculation device based on latent space information calculated for the output of the first feature calculation device for input information and ii) second output data of the second feature calculation device for the input information.

An apparatus for re-registering identity feature information in an identity recognition system according to an additional aspect of the present disclosure may comprise a processor and a memory, wherein the processor may be configured to: identify one or more first identity feature information calculated by the first feature calculation device and stored in a database; generate one or more latent space information by inputting the one or more first identity feature information into a specific model for latent space estimation; generate one or more second identity feature information by inputting the one or more latent space information into a second feature calculation device; and store the one or more second identity feature information in a new database. Herein, the specific model may correspond to a model learned through similarity comparison between i) first output data of the second feature calculation device based on latent space information calculated for the output of the first feature calculation device for input information and ii) second output data of the second feature calculation device for the input information.

As one or more non-transitory computer readable medium storing one or more instructions, the one or more instructions may be executed by one or more processors and control an apparatus for re-registering identity feature information in an identity recognition system to: identify one or more first identity feature information calculated by the first feature calculation device and stored in a database; generate one or more latent space information by inputting the one or more first identity feature information into a specific model for latent space estimation; generate one or more second identity feature information by inputting the one or more latent space information into a second feature calculation device; and store the one or more second identity feature information in a new database. Herein, the specific model may correspond to a model learned through similarity comparison between i) first output data of the second feature calculation device based on latent space information calculated for the output of the first feature calculation device for input information and ii) second output data of the second feature calculation device for the input information.

In various aspects of the present disclosure, the one or more first identity feature information may be based on a first representation domain according to the first feature calculation device, and the one or more second identity feature information may be based on a second representation domain according to the second feature calculation device.

In various aspects of the present disclosure, the one or more first identity feature information and the one or more second identity feature information may be based on the format of a feature value or feature vector related to an identity of an user.

In various aspects of the present disclosure, the second feature calculation device may correspond to a new feature calculation device that replaces the first feature calculation device in the identity recognition system.

In various aspects of the present disclosure, the input information may correspond to an image file or video file of a frontal face of an user. In this regards, the input information may be input to the first feature calculation device and the second feature calculation device by normalizing face area information detected in the image file or the video file and converting the normalized face area information to a size required for input to feature calculation device, when performing the similarity comparison.

In various aspects of the present disclosure, the specific model may correspond to a generative model based on artificial intelligence. In this regards, the generative model may be based on at least one of a generative adversarial network (GAN), a variational autoencoder (VAE), or a diffusion model.

In various aspects of the present disclosure, the similarity comparison may be based on at least one of mean squared error or cosine similarity between the first output data and the second output data.

According to the present disclosure, there is an effect in that pre-registered identity feature information may be re-registered to fit the representation domain of a new feature calculation device without storing/utilizing the user's personal information such as photos and videos.

According to the present disclosure, there is an effect in that the system can be operated continuously without the need to perform a re-registration process for all users by converting pre-registered identity feature information into the representation domain of a new feature calculation device.

Effects achievable by the present disclosure are not limited to the above-described effects, and other effects which are not described herein may be clearly understood by those skilled in the pertinent art from the following description.

DETAILED DESCRIPTION

Figure 1:
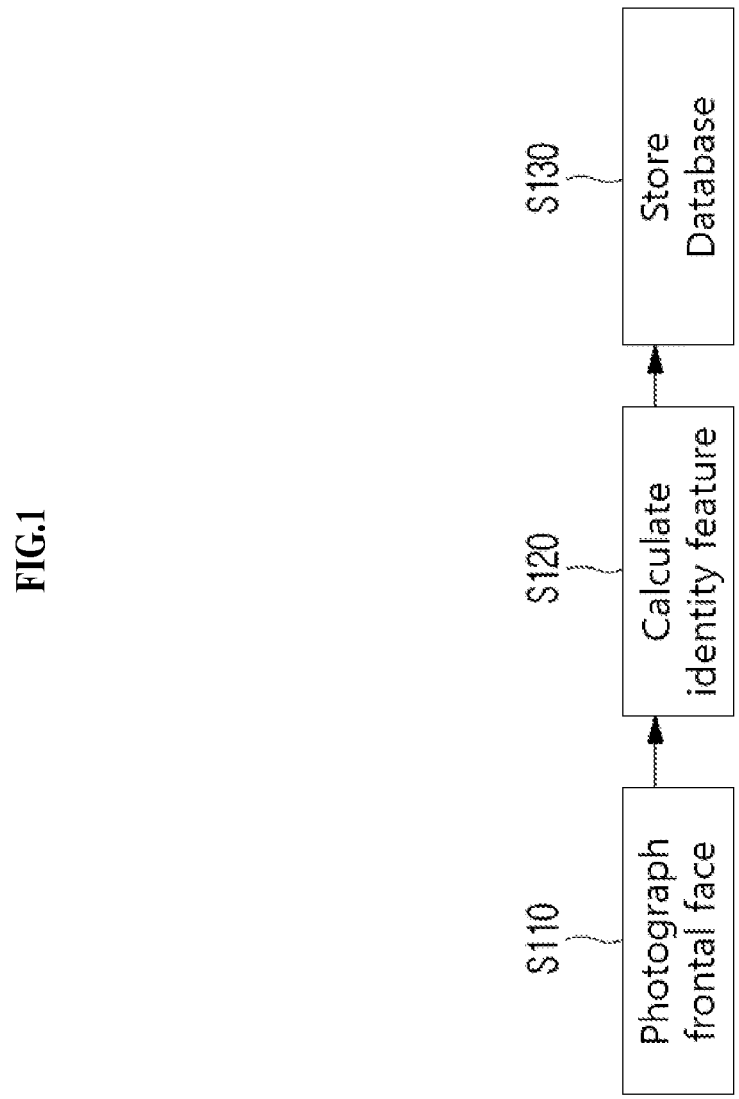
FIG. 1 illustrates a registration process of identity feature information in a general identity recognition system.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

If the main feature calculation device in the identity recognition system is changed, user information, that is, the user's identity feature information, needs to be re-registered.

Specifically, when the main feature calculation device changes, the representation/expression range of the device changes, previously registered identity feature information may not be used as is. As an example, if the personal identity feature calculation device changes, because different representation domains are generated during the creation of computational devices, even if it is the same person, it may be calculated with different feature vectors.

Therefore, in this case, a process of re-registering the user identity characteristic information to fit the new expression range is necessary.

However, the process of re-registering the information of all users registered in the identity recognition system may be impossible for the following reasons.

For example, when registering identity information in an existing identity recognition system, if you store images and/or videos of the user's face as well as identity feature information (e.g., identity feature values), new identity feature information may be calculated and stored using the image and/or video. However, it may be common for the user's facial image and/or video not to be stored due to reasons such as personal information protection. Therefore, it is difficult to apply a method of re-registering identity feature information using a registered user's facial image and/or video.

For another example, when there are only a small number of users registered and utilized in the identity recognition system, When the system changes, a re-registration process may be performed through the user's visit. However, if there are multiple users, it may not be possible for all users to visit in person and perform the re-registration process, and it may take a considerable amount of time.

For the reasons described above, etc., In the identity recognition system, there is a problem that the process of manually re-registering the user every time the main feature calculation device is changed has physical limitations.

Therefore, a method of performing re-registration according to the expression area of the changed identity feature calculation device using previously registered identity feature information (e.g., identity feature vector) about the user, without storing/utilizing the user's personal information such as photos, images, and/or videos is proposed in the present disclosure.

In this regard, specifically, a method of learning a device/model that transforms a feature vector using a pre-registered feature vector, an existing feature calculation device, and a new/changed feature calculation device is proposed. Additionally, a method to automatically convert/re-register identity features into a new representation domain using a learned device/model is proposed.

Hereinafter, preferred embodiments of the present disclosure will be described in detail with reference to the attached drawings.

FIG. 1 illustrates a registration process of identity feature information in a general identity recognition system.

Referring to FIG. 1, for the registration process, the user's frontal face is first photographed (S110).

Identity feature information (e.g., identity feature value, identity feature vector) for the user may be calculated through operations in an identity feature calculation device for the captured image and/or video (S120).

Afterwards, the calculated identity feature information may be stored in the database (S130) to complete the registration process.

The identity feature information calculated in the process may be determined according to the characteristics of the identity feature calculation device. Therefore, when the identity feature calculation device is changed, it is necessary to re-register/update the already registered information to suit the characteristics of the new identity feature calculation device.

However, as described above, there may be cases where the re-registration process takes a considerable amount of time or it is impossible to perform the re-registration process.

Therefore, as proposed in this disclosure, a method may be required to recycle existing registered information and convert it into identity feature information/values suitable for the characteristics of a new feature calculation device.

The method of learning a system for converting existing identity feature information into new identity feature information (i.e., transition system) proposed in the present disclosure may be as follows.

Figure 2:
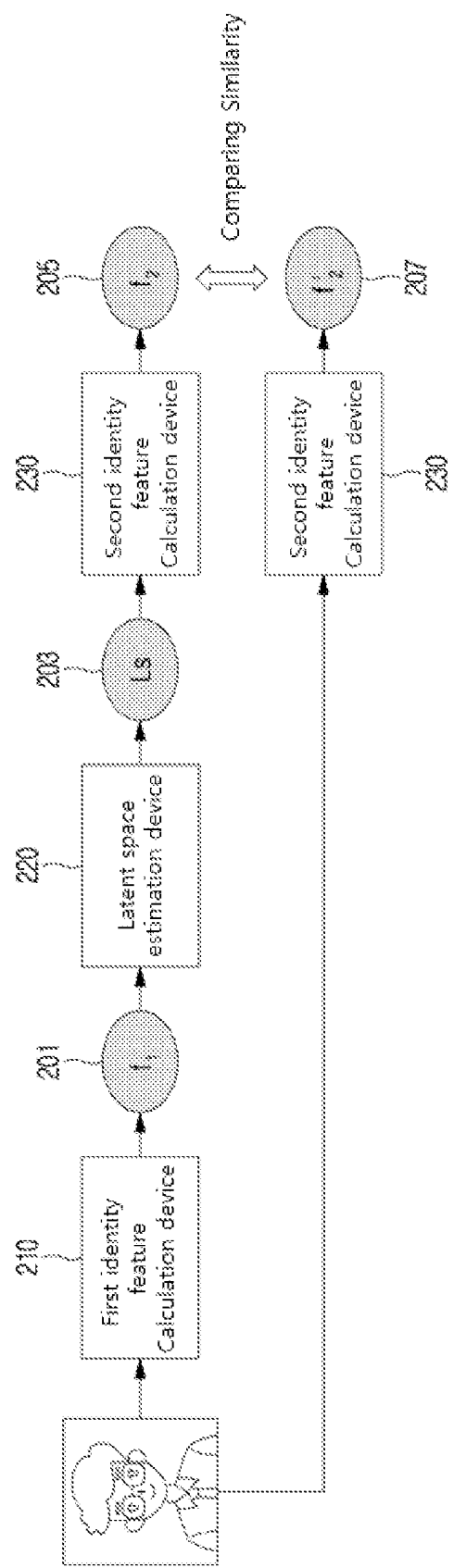
FIG. 2 illustrates a learning process of a system for converting to new identity feature information according to an embodiment of the present disclosure.

FIG. 2 illustrates a learning process of a system for converting to new identity feature information according to an embodiment of the present disclosure.

Referring to FIG. 2, the first identity feature calculation device 210, the latent space estimation device 220, and the second identity feature calculation device 230 may be used/utilized to learn the system for conversion to new identity feature information.

Here, the first identity feature calculation device 210 may correspond to an existing identity feature calculation device in the identity recognition system, and the second identity feature calculation device may correspond to a changed/new identity feature calculation device in the identity recognition system.

In this regard, there may be no separate restrictions on the preprocessing process of a general identity recognition system, and it may follow the requirements of existing feature calculation devices.

For example, the pre-processing process of a general identity recognition system may include a series of processes such as detecting a face from an image and/or video taken of a user, normalizing the detected face area, and converting the size required for input to the feature calculation device.

In other words, the pre-processing process of a general identity recognition system may correspond to the process of calculating/obtaining the first identity feature information ($f_1$) 201 by the first identity feature calculation device 210 in FIG. 2.

The latent space estimation device 220 may receive the first identity feature information 201 calculated from the first identity feature calculation device 210 as input, and may output latent space information (Latent space, Ls) 203 based on the input.

For example, generative models such as generative adversarial model (GAM), variational autoencoder (VAE), Diffusion Model, or the like may be used as the latent space estimation device 220, and the scope thereof is not limited.

The latent space information 203, which is an output value from the latent space estimation device 220, may be used as an input to the second identity feature calculation device 230, and second identity feature information ($f_2$) 205 may be calculated/obtained by the second identity feature calculation device 230 based on the input.

At the same time, third identity feature information ($f_2$) 207 may be calculated/obtained by directly inputting the data used as input to the first identity feature calculation device 210 into the second identity feature calculation device 230.

In this regard, training/learning may proceed repeatedly in the direction of minimizing the similarity between the second identity feature information 205 and the third identity feature information 207 calculated by the second identity feature calculation device 230.

Here, proceeding training/learning in the direction of minimizing similarity may mean proceeding training/learning so that there is actual identity/similarity between the two pieces of information.

Methods such as mean squared error (MSE) and cosine similarity will be used as a method of comparing the similarity between the second identity feature information 205 and the third identity feature information 207. There may be no separate restrictions on the method.

In relation to the above-described learning process, the first identity feature calculation device 210, the latent space estimation device 220, and the second identity feature calculation device 230 may correspond to devices learned through separate data, and may not change the value according to the above-described learning process and be used only for simple feature calculation.

Additionally, with respect to the data used in the above-described learning process, facial images and/or videos that may be (freely) obtained online, etc., independently of the user's information registered in the identity recognition system, may be used.

After the learning as shown in FIG. 2 described above is completed, the method of transferring/converting the pre-registered identity feature information may be as follows.

Figure 3:
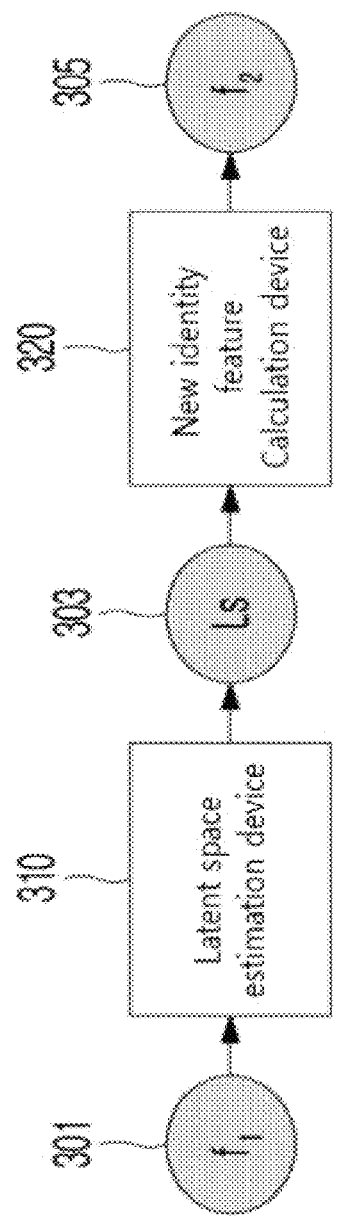
FIG. 3 illustrates a process for converting identity feature information based on a learned system according to an embodiment of the present disclosure.

FIG. 3 illustrates a process for converting identity feature information based on a learned system according to an embodiment of the present disclosure.

The latent space estimation device 310 in FIG. 3 corresponds to the latent space estimation device learned through the training/learning process in FIG. 2 described above. Additionally, the new identity feature calculation device 320 may correspond to the second identity feature calculation device in the training/learning process in FIG. 2.

It may be possible to read the existing identity feature information ($f_1$) 301 calculated from an existing feature calculation device (e.g., a first identity feature calculation device) and stored in a database in order, and then the information trained/learned through the procedure in FIG. 2 may be input to the latent space estimation device 310.

The latent space estimation device 310 may output latent space information 303 based on the input information.

The output latent space information 303 may be input to a new identity feature calculation device 320 (e.g., a second identity feature calculation device), and the new identity feature calculation device 320 may calculate/output new identity feature information ($f_2$) 305 based on the input.

The calculated/output new identity feature information 305 may be stored in a database.

A new database may be generated by sequentially applying the above-described process to all feature information of existing users registered in the database.

In performing this process, the user's personal information is not used at all, through a series of automated operations, pre-registered identity feature information may be transferred/converted into identity feature information suitable for the representation domain of the new identity feature calculation device and stored.

Figure 4:
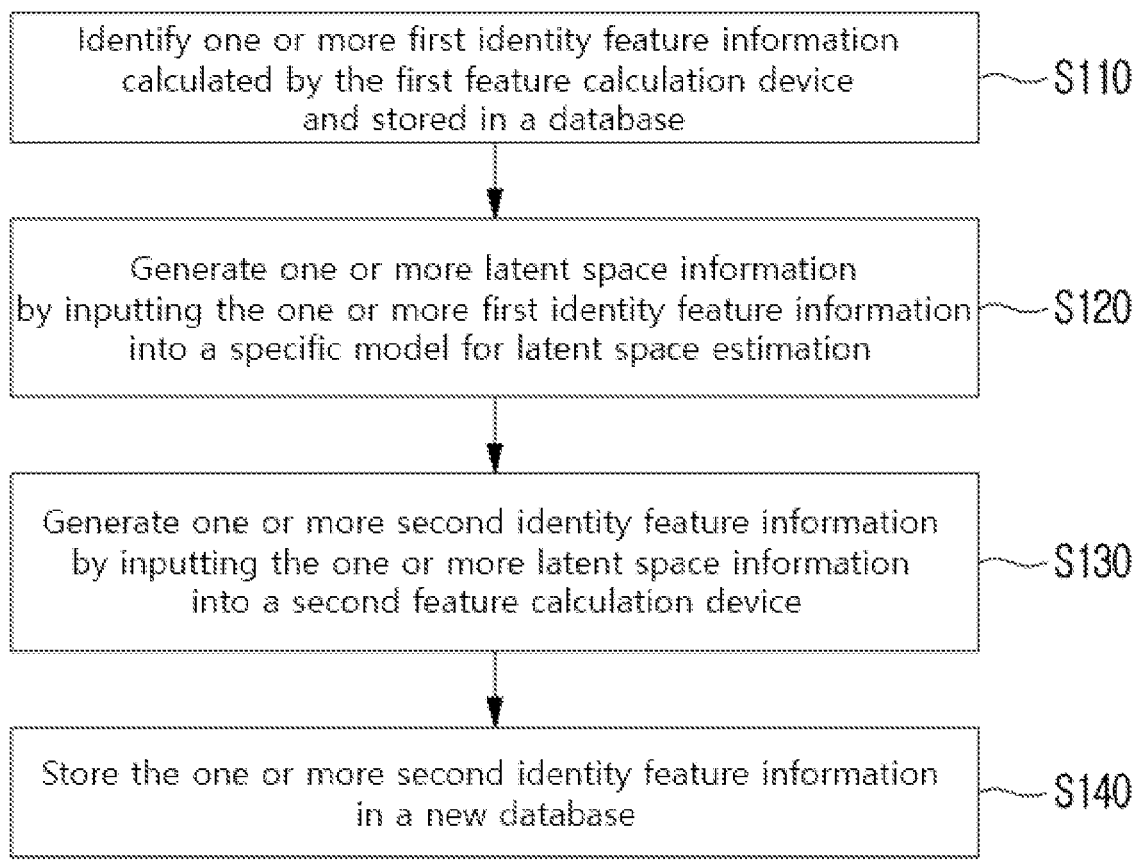
FIG. 4 illustrates an operation flowchart for a method for converting identity feature information according to an embodiment of the present disclosure.

FIG. 4 illustrates an operation flowchart for a method for converting identity feature information according to an embodiment of the present disclosure.

In step S110, one or more first identity feature information calculated by the first feature calculation device and stored in the database may be identified/confirmed.

For example, the first feature calculation device may correspond to an existing identity feature calculation device in an identity recognition system (e.g., the first identity feature calculation device 210 described in FIG. 2).

For example, one or more first identity feature information may correspond to existing identity feature information ($f_1$) 301 described in FIG. 3.

In step S120, one or more latent space information may be generated by inputting the one or more first identity feature information into a specific model for latent space estimation.

For example, the specific model may correspond to a latent space estimation device (e.g., the latent space estimation device 310 in FIG. 3) learned through the training/learning process described in FIG. 2.

For example, the specific model may correspond to a generative model based on artificial intelligence. As an example, the corresponding generative model may be based on at least one of a generative adversarial network (GAN), a variational autoencoder (VAE), or a diffusion model.

In step S130, the one or more latent space information may be input to a second feature calculation device to generate one or more second identity feature information.

For example, the second feature calculation device may correspond to a new feature calculation device that replaces the first feature calculation device in the identity recognition system (e.g., the first identity feature calculation device 230 described in FIG. 2 and the new identity feature calculation device 320 described in FIG. 3).

For example, one or more first identity feature information may correspond to new identity feature information ($f_2$) 305 described in FIG. 3.

In step S140, the one or more second identity feature information may be stored in a new database.

In relation to the above-described steps, the specific model may correspond to a model learned through similarity comparison between i) first output data of the second feature calculation device based on latent space information calculated for the output of the first feature calculation device for input information and ii) second output data of the second feature calculation device for the input information.

The input information may correspond to an image file or video file for the user's frontal face. In this regard, the input information may be input to the first feature calculation device and the second feature calculation device by normalizing face area information detected in the image file or the video file and converting the normalized face area information to a size required for input to feature calculation device, when performing the similarity comparison.

Additionally or alternatively, the one or more first identity feature information may be based on a first representation domain according to the first feature calculation device, and the one or more second identity feature information may be based on a second representation domain different from the second feature calculation device.

That is, the first feature calculation device and the second feature calculation device may support different representation domains(/areas)/ranges. Here, supporting different representation domains(/areas)/ranges may mean that result values (e.g., feature values, feature vectors) by the feature calculation device for the same image and/or video are output/calculated as different values.

Additionally or alternatively, the one or more first identity feature information and the one or more second identity feature information may be based on a format of a feature value or feature vector associated with the user's identity.

In other words, identity feature information may be expressed as a feature value/vector representing the user's identity.

Figure 5:
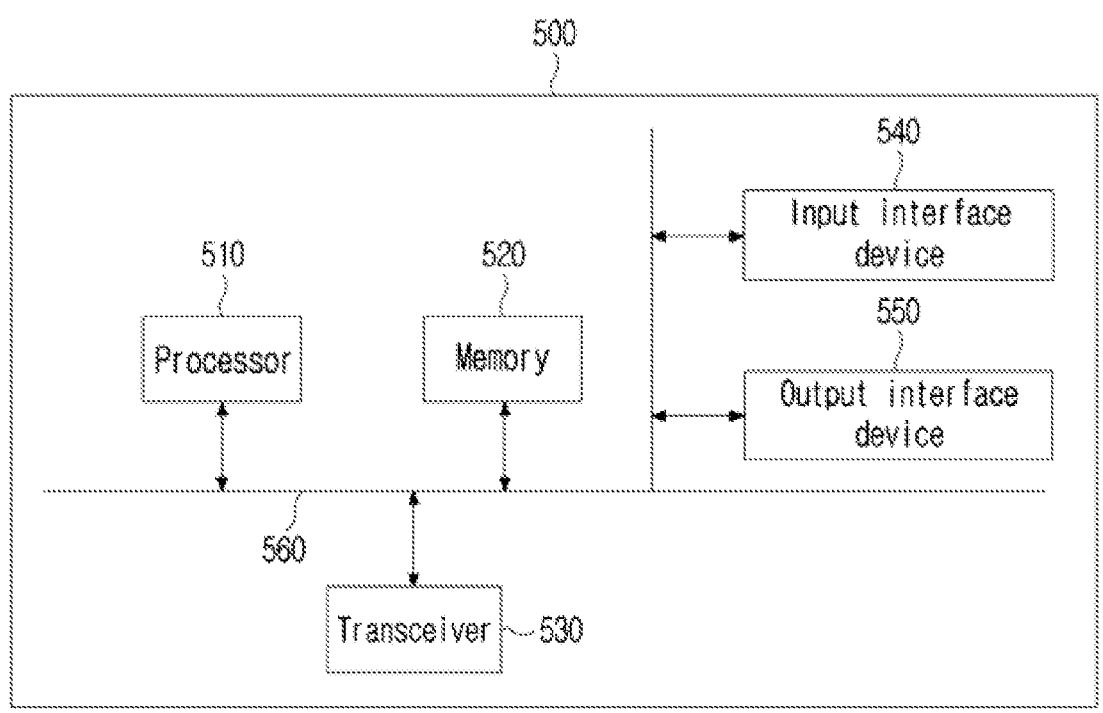
FIG. 5 is a block diagram illustrating a device according to an embodiment of the present disclosure.

FIG. 5 is a block diagram illustrating an apparatus according to an embodiment of the present disclosure.

Referring to FIG. 5, a device 900 may represent a device in which a method for performing transformation of identity feature information and related learning described in the present disclosure is implemented.

For example, the device 500 may generally support/perform a function to learn a latent space estimation device for conversion of identity feature information, and a function to convert already registered identity feature information to fit the expression area of a new feature calculation device.

The device 500 may include at least one of a processor 510, a memory 520, a transceiver 530, an input interface device 540, and an output interface device 550. Each of the components may be connected by a common bus 560 to communicate with each other. In addition, each of the components may be connected through a separate interface or a separate bus centering on the processor 510 instead of the common bus 560.

The processor 510 may be implemented in various types such as an application processor (AP), a central processing unit (CPU), a graphic processing unit (GPU), etc., and may be any semiconductor device that executes a command stored in the memory 520. The processor 510 may execute a program command stored in the memory 520. The processor 510 may be configured to implement a method/device for performing conversion and related learning of identity feature information described based on FIGS. 1 to 4 described above.

And/or, the processor 510 may store a program command for implementing at least one function for the corresponding modules in the memory 520 and may control the operation described based on FIGS. 1 to 4 to be performed.

The memory 520 may include various types of volatile or non-volatile storage media. For example, the memory 520 may include read-only memory (ROM) and random access memory (RAM). In an embodiment of the present disclosure, the memory 520 may be located inside or outside the processor 510, and the memory 520 may be connected to the processor 510 through various known means.

The transceiver 530 may perform a function of transmitting and receiving data processed/to be processed by the processor 510 with an external device and/or an external system.

The input interface device 540 is configured to provide data to the processor 510.

The output interface device 550 is configured to output data from the processor 510.

The method proposed in the present disclosure is a method to solve the problem of the need for user re-registration due to a change in the feature calculation device.

If information on the user's face image and/or video is preserved, the above problem may be easily solved, but as the need to protect personal information expands, such a response may not be possible.

In this case, it may be efficient in terms of time and cost, in that the system may be operated continuously without performing a direct re-registration process for all users, by converting pre-registered information (e.g., pre-registered identity feature information) into the representation domains (/areas)/ranges of the new feature calculation device through the method proposed in the present disclosure, As described above, the method and device for re-registering previously registered identity feature information without personal information according to the embodiment of the present disclosure are not limited to the configuration and method in the above-described embodiment. That is, the embodiments of the present disclosure described above may be configured by selectively combining all or part of the embodiments so that various modifications may be made.

Additionally, the method proposed in the present disclosure may be extended and applied not only to identity recognition systems but also to other types of systems that calculate feature information (e.g., feature vectors) from images/videos.

The components described in the example embodiments may be implemented by hardware components including, for example, at least one digital signal processor (DSP), a processor, a controller, an application-specific integrated circuit (ASIC), a programmable logic element, such as an FPGA, GPU other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Accordingly, it is intended that this disclosure embrace all other substitutions, modifications and variations belong within the scope of the following claims.

What is claimed is:

1. A method of re-registering identity feature information in an identity recognition system, the method comprising:
   identifying, by a processor for the identity recognition system, one or more first identity feature information calculated by the first feature calculation device and stored in a database;
   generating, by the processor, one or more latent space information by inputting the one or more first identity feature information into a specific model for latent space estimation;
   generating, by the processor, one or more second identity feature information by inputting the one or more latent space information into a second feature calculation device; and
   storing, by the processor, the one or more second identity feature information in a new database,
   wherein the specific model is trained by repeatedly performing similarity comparison between i) first output data obtained by inputting specific latent space information into the second feature calculation device and ii) second output data obtained by inputting input data into the second feature calculation device, and
   wherein the specific latent space information is generated by inputting output data, which is obtained by inputting the input data into the first feature calculation device, into the specific model.

2. The method of claim 1,
   wherein the one or more first identity feature information is based on a first representation domain according to the first feature calculation device, and
   wherein the one or more second identity feature information is based on a second representation domain according to the second feature calculation device.

3. The method of claim 1,
   wherein the one or more first identity feature information and the one or more second identity feature information are based on the format of a feature value or feature vector related to an identity of a user.

4. The method of claim 1,
   wherein the second feature calculation device corresponds to a new feature calculation device that replaces the first feature calculation device in the identity recognition system.

5. The method of claim 1,
   wherein the input data corresponds to an image file or video file of a frontal face of a user.

6. The method of claim 5,
   wherein the input data is input to the first feature calculation device and the second feature calculation device by normalizing face area information detected in the image file or the video file and converting the normalized face area information to a size required for input to feature calculation device, when performing the similarity comparison.

7. The method of claim 1,
wherein the specific model corresponds to a generative model based on artificial intelligence.

8. The method of claim 7,
wherein the generative model is based on at least one of a generative adversarial network (GAN), a variational autoencoder (VAE), or a diffusion model.

9. The method of claim 1,
wherein the similarity comparison is based on at least one of mean squared error or cosine similarity between the first output data and the second output data.

10. An apparatus for re-registering identity feature information in an identity recognition system, the apparatus comprising:
a processor and a memory,
wherein the processor is configured to:
identify one or more first identity feature information calculated by the first feature calculation device and stored in a database;
generate one or more latent space information by inputting the one or more first identity feature information into a specific model for latent space estimation;
generate one or more second identity feature information by inputting the one or more latent space information into a second feature calculation device; and
store the one or more second identity feature information in a new database,
wherein the specific model corresponds to a model trained by repeatedly performing similarity comparison between i) first output data obtained by inputting specific latent space information into the second feature calculation device and ii) second output data obtained by inputting the input data into the second feature calculation device, and
wherein the specific latent space information is generated by inputting output data, which is obtained by inputting input data into the first feature calculation device, into the specific model.

11. The apparatus of claim 10,
wherein the one or more first identity feature information is based on a first representation domain according to the first feature calculation device, and
wherein the one or more second identity feature information is based on a second representation domain according to the second feature calculation device.

12. The apparatus of claim 10,
wherein the one or more first identity feature information and the one or more second identity feature information are based on the format of a feature value or feature vector related to an identity of a user.

13. The apparatus of claim 10,
wherein the second feature calculation device corresponds to a new feature calculation device that replaces the first feature calculation device in the identity recognition system.

14. The apparatus of claim 10,
wherein the input data corresponds to an image file or video file of a frontal face of a user.

15. The apparatus of claim 14,
wherein the input data is input to the first feature calculation device and the second feature calculation device by normalizing face area information detected in the image file or the video file and converting the normalized face area information to a size required for input to feature calculation device, when performing the similarity comparison.

16. The apparatus of claim 10,
wherein the specific model corresponds to a generative model based on artificial intelligence.

17. The apparatus of claim 16,
wherein the generative model is based on at least one of a generative adversarial network (GAN), a variational autoencoder (VAE), or a diffusion model.

18. The apparatus of claim 10,
wherein the similarity comparison is based on at least one of mean squared error or cosine similarity between the first output data and the second output data.

19. One or more non-transitory computer readable medium storing one or more instructions,
wherein the one or more instructions are executed by one or more processors and control an apparatus for re-registering identity feature information in an identity recognition system to:
identify one or more first identity feature information calculated by the first feature calculation device and stored in a database;
generate one or more latent space information by inputting the one or more first identity feature information into a specific model for latent space estimation;
generate one or more second identity feature information by inputting the one or more latent space information into a second feature calculation device; and
store the one or more second identity feature information in a new database,
wherein the specific model corresponds to a model trained by repeatedly performing similarity comparison between i) first output data obtained by inputting specific latent space information into the second feature calculation device and ii) second output data obtained by inputting the input data into the second feature calculation device, and
wherein the specific latent space information is generated by inputting output data,
which is obtained by inputting input data into the first feature calculation device, into the specific model.

* * * * *